United States Patent
Maruhashi et al.

(10) Patent No.: US 11,838,934 B2
(45) Date of Patent: Dec. 5, 2023

(54) COMMUNICATIONS NETWORK SYSTEM MANAGING COMMUNICATIONS POLICIES BASED ON DETECTED STATE OF COMMUNICATION ENVIRONMENT, AND COMMUNICATIONS NETWORK METHOD

(71) Applicant: NATIONAL INSTITUTE OF INFORMATION AND COMMUNICATIONS TECHNOLOGY, Koganei (JP)

(72) Inventors: Kenichi Maruhashi, Tokyo (JP); Satoko Itaya, Tokyo (JP); Fumihide Kojima, Tokyo (JP)

(73) Assignee: NATIONAL INSTITUTE OF INFORMATION AND COMMUNICATIONS TECHNOLOGY, Tokyo (JP)

( * ) Notice: Subject to any disclaimer, the term of this patent is extended or adjusted under 35 U.S.C. 154(b) by 549 days.

(21) Appl. No.: 16/970,443

(22) PCT Filed: Mar. 8, 2019

(86) PCT No.: PCT/JP2019/009369
§ 371 (c)(1),
(2) Date: Aug. 17, 2020

(87) PCT Pub. No.: WO2019/188126
PCT Pub. Date: Oct. 3, 2019

(65) Prior Publication Data
US 2021/0120558 A1 Apr. 22, 2021

(30) Foreign Application Priority Data
Mar. 29, 2018 (JP) ................. 2018-064328

(51) Int. Cl.
*H04W 72/53* (2023.01)
*H04L 47/35* (2022.01)
*H04W 72/56* (2023.01)

(52) U.S. Cl.
CPC ............. *H04W 72/53* (2023.01); *H04L 47/35* (2013.01); *H04W 72/56* (2023.01)

(58) Field of Classification Search
CPC ................................................ H04W 72/0493
See application file for complete search history.

(56) References Cited

U.S. PATENT DOCUMENTS 6,778,596 B1 * 8/2004 Tzannes .................. H04L 47/10
375/222
11,119,452 B2 9/2021 Itaya et al.
(Continued)

FOREIGN PATENT DOCUMENTS

JP     2009246874 A    10/2009
JP     2013258618 A    12/2013
(Continued)

OTHER PUBLICATIONS

International Search Report (ISR) (and English language translation thereof) dated Jun. 11, 2019 issued in International Application No. PCT/JP2019/009369.
(Continued)

*Primary Examiner* — Edan Orgad
*Assistant Examiner* — Won Tae C Kim
(74) *Attorney, Agent, or Firm* — Holtz, Holtz & Volek PC (57) ABSTRACT

A communications network system includes a control unit, one or more wireless systems, and application equipment. The control unit acquires information about data that the application equipment communicates via the wireless systems, and acquires information about a wireless environment that has an impact on communications by the wireless systems. The control unit generates a plurality of communications policies that are delivered to the wireless systems, and manages the communications policies that are executed on the wireless systems. The wireless systems store the plurality of communications policies delivered from the control unit, and detect the status of communications, change the communications policies based on the detection
(Continued)

result, and control information about data that the application equipment communicates via the wireless systems.

9 Claims, 7 Drawing Sheets

(56) References Cited

U.S. PATENT DOCUMENTS

| | | | |
|---|---|---|---|
| 2015/0289250 A1 | 10/2015 | Ishizu et al. | |
| 2015/0365828 A1* | 12/2015 | Saida | H04M 3/00 455/411 |
| 2017/0019845 A1 | 1/2017 | Nakahara | |
| 2019/0243315 A1* | 8/2019 | Itaya | G05B 13/0205 |

FOREIGN PATENT DOCUMENTS

| | | |
|---|---|---|
| JP | 2014230103 A | 12/2014 |
| JP | 2017130031 A | 7/2017 |
| WO | 2015145953 A1 | 10/2015 |
| WO | 2016016432 A2 | 2/2016 |
| WO | 2017126491 A1 | 7/2017 |

OTHER PUBLICATIONS

Written Opinion dated Jun. 11, 2019 issued in International Application No. PCT/JP2019/009369.
Extended European Search Report (EESR) dated Nov. 30, 2021, issued in counterpart European Application No. 19777362.5.
Supplementary European Search Report dated Dec. 17, 2021, issued in European Application No. 19777362.5.

* cited by examiner

| COMMUNICATIONS POLICY |
|---|
| COMMUNICATIONS PARAMETERS X |

PRIOR ART (b)

| REFERENCE | COMMUNICATIONS POLICY | | |
|---|---|---|---|
| | PARAMETER | CONDITION 1 (REWRITING OF THE FFI D) | CONDITION 2 (OTHERS) |
| 0–30 | COMMUNICATIONS PARAMETER A | NONE | NONE |
| 31–60 | COMMUNICATIONS PARAMETER B | PATTERN 1A | PATTERN 2A |
| 61–90 | COMMUNICATIONS PARAMETER C | PATTERN 1B | PATTERN 2B |
| 91–100 | COMMUNICATIONS PARAMETER D | PATTERN 1C | PATTERN 2C |
| ⋮ | ⋮ | ⋮ | ⋮ |

FIG. 5

PRIOR ART

COMMUNICATIONS NETWORK SYSTEM MANAGING COMMUNICATIONS POLICIES BASED ON DETECTED STATE OF COMMUNICATION ENVIRONMENT, AND COMMUNICATIONS NETWORK METHOD

TECHNICAL FIELD

The present invention relates to a communications network system formed with a controller, and one or more wireless systems, and application equipment.

BACKGROUND ART

In recent years, for example, in facilities and work sites such as factories (manufacturing factory, processing factory, etc.), warehouses (distribution warehouse, delivery warehouse, etc.) and so forth, the use of cable communications has been common up until the present, from the perspective of the reliability of communications. However, given the shortening of product development and manufacturing cycles in recent years, or the shortening of delivery times in logistics delivery, there is a need for greater flexibility when deploying equipment, constructing lines, and/or making changes to these, and therefore the expectation for the use of wireless communications has been increasing.

In wireless communications, various types of wireless systems such as wireless LAN (Local Area Network) have been introduced. The communications systems, communications equipment, network devices, wireless systems, network configurations, and so forth introduced in individual factories or warehouses are not all the same, and the role and purpose of each factory or warehouse, the time of establishment and introduction, and/or the like vary. As for the wireless systems, for example, application equipment that is formed with terminal equipment such as a line sensor for inspection, an environmental sensor, or a surveillance camera, and equipment such as a server and a surveillance terminal that has software for its visualization and analysis, is applicable.

Given these wireless systems, each wireless system may be controlled by a controller in groups of certain predetermined functions, or in a predetermined range (area, direction, etc.).

Each wireless system has no mechanism for cooperating with other wireless systems. It then follows that each wireless system has to transmit and receive data at radio frequencies allocated thereto, based on the communications parameters configured for each wireless system, which, from the perspective of overall optimization, makes it difficult to use a plurality of wireless systems efficiently. In addition, there are a variety of types of application equipment for exchanging data using wireless systems in individual factories or warehouses, and every application equipment exchanges data, via wireless systems, depending on its function, processing load, state, and so forth, and therefore the frequency of communications, the volume of communications and/or others vary. Meanwhile, because the performance (available band, communications quality, etc.) of wireless channels used in wireless systems also varies, the mechanism for coping with such variation is necessary.

Patent Literature 1 discloses a technique for dynamically reconfiguring the control of wireless systems in a plurality of cable or wireless communications network systems. Even if every constituent device does not have a common interface, management is made based on access policy information, so that the communications cost and the performance of wireless systems can be improved. As a result of this, it is possible to provide a communications method that improves user satisfaction, so that it is possible to use resources effectively in the whole network, and, in particular, use frequency resources effectively.

Patent Literature 2 discloses a technique related to an equipment management system, which monitors and controls one or more pieces of equipment installed in a factory, via wireless communications. Under the concept of on-demand manufacturing, information for controlling equipment, and information that is detected from the equipment and reflected in future business improvement are roughly divided, and the equipment is controlled based on control policies from outside. By this means, it is possible to effectively realize appropriate communications path control.

However, in Patent Literature 1 and Patent Literature 2, the system side configures policies to meet the requirements for wireless information, communications quality, stability, cost, and power consumption, and delivers these policies to each wireless system for control. The frequency of communications, the volume of communications, the performance of wireless channels, and so forth required by the application equipment used in individual factories and warehouses may vary dynamically, and, in such cases, the number of parameters increases, but fixed policies that are generated on the controller side and transmitted cannot cope with such cases.

Also, in communications in which low latency is required, it is not possible to make it in time to generate new policies on the controller side, and update them on wireless systems. In particular, when the quality of wireless communications deteriorates, the wireless systems communicate based on policies before updating, and so the communications between the controller and the wireless systems is also unstable.

CITATION LIST

Patent Literature

Patent Literature 1: Japanese Unexamined Patent Application Publication No. 2009-246874

Patent Literature 2: Japanese Unexamined Patent Application Publication No. 2017-130031

SUMMARY OF INVENTION

Problem to be Solved by the Invention

It is therefore an object of the present invention to provide a communications network system that is formed with a controller, one or more wireless systems, and application equipment, and that, even if there is a sudden and significant change in ongoing communications, can quickly control wireless systems, meet the requirements such as low latency, and use frequency resources effectively in the whole system formed with a plurality of wireless systems.

Means for Solving the Problems

In order to solve the above-mentioned problems, the present inventors have invented a communications network system formed with a controller, one or more wireless systems, and application equipment.

The communications network system according to a first invention includes a controller, one or more wireless systems, and application equipment. The controller includes a data information acquisition unit to acquire information about data that the application equipment communicates via the wireless systems, a wireless environment information acquisition unit to acquire information about a wireless environment that has an impact on communications by the wireless systems, a policy generation unit to generate a plurality of communications policies that are delivered to the wireless systems, a policy management unit to manage the communications policies that are executed on the wireless systems, and a network controller to carry out the data communications with the wireless system. The wireless systems at least include a policy agent unit to store the plurality of communications policies delivered from the controller, and to detect the status of communications by the wireless systems and change the communications policies, and a wireless system control unit to control information about data that the application equipment communicates via the wireless systems based on the communications policies.

Based on the first invention, in the communications network system according to a second invention, the policy agent unit changes to one of the plurality of stored communications policies, without inquiring the controller in advance, delivers the plurality of changed communications policies to the controller after the change, and maintains the communications policies until a communications policy is delivered again.

Based on the first invention or the second invention, in the communications network system according to a third invention, at least any one of a transmission frequency, a route, a transmission timing, transmission power, and antenna directivity is subject to control in the wireless system control unit.

Based on the first invention to the third invention, in the communications network system according to a fourth invention, the control in the wireless system control unit is determined based at least on the communications policies and priority information that is attached to a data frame of a packet communicated via the wireless systems.

Based on the fourth invention, in the communications network system according to a fifth invention, the policy agent unit checks on the stored data frame, and rewrites the priority information attached to the data frame.

The communications network method according to a sixth invention is a communications network method including a controller, one or more wireless systems, and application equipment. The controller includes a first step of acquiring information about data that the application equipment communicates via the wireless systems, a second step of acquiring information about a wireless environment that has an impact on communications by the wireless systems, a third step of generating a plurality of communications policies that are delivered to the wireless systems, a fourth step of managing the communications policies that are executed on the wireless systems, and a fifth step of carrying out the data communications with the wireless systems. The wireless systems at least include a sixth step of storing the plurality of communications policies delivered from the controller, detecting the status of communications by the wireless systems, and changing the communications policies, and a seventh step of controlling information about data that the application equipment communicates via the wireless systems based on the communications policies.

Advantageous Effects of Invention

According to the first invention, the controller acquires information about the data that the application equipment communicates via the wireless systems, acquires information about the wireless environment that has an impact on communications by the wireless systems, generates a plurality of communications policies that are delivered to the wireless systems, manages the communications policies that are executed on the wireless systems, and controls the network that performs data communications with the wireless systems. The wireless systems store a plurality of communications policies delivered from the controller, detects the status of communications by the wireless systems, changes the communications policies based on the detection result, and controls information of data that the application equipment communicates via the wireless systems based on the communications policies. This allows each wireless system to take the initiative in selecting and determining an appropriate communications policy even if there is a sudden and significant change in ongoing communications. Consequently, the wireless systems can be controlled quickly, requirements such as low latency can be satisfied, and flexible operation of the wireless systems can be supported. It is possible to use frequency resources effectively, not only in the corresponding wireless system, but also in the whole system formed with a plurality of wireless systems. Furthermore, since a plurality of wireless systems are controlled based on different communications policies, it is possible to keep overall balance, and optimize the communications systems.

According to the second invention, the policy agent unit changes to any one of the above stored communications policies without inquiring the controller in advance, delivers the changed communications policies to the controller after the change, and maintains the changed communications policies until a communications policy is delivered again. By this means, when there is a sudden and significant change in ongoing communications, it is possible to change to an appropriate communications policy among a plurality of communications policies delivered in advance from the controller. Furthermore, the data field defined by the communications policies can be rewritten, and the data can be changed and rewritten without inquiring the controller. Consequently, the wireless systems can be controlled quickly, and flexible operation of the wireless systems can be supported. It is possible to use frequency resources effectively, not only in the corresponding wireless system, but also in the whole system formed with a plurality of wireless systems.

According to the third invention, at least any one of the transmission frequency, the route, the transmission timing, the transmission power, and the antenna directivity is subject to control by the wireless system control unit. Consequently, if there is a sudden and significant change in ongoing communications, the status of the communications network and the surrounding environment can be detected quickly, and a more appropriate communications policy can be selected and determined. Consequently, the wireless systems can be controlled quickly, and flexible operation of the wireless systems can be supported.

According to the fourth invention, the wireless system control unit determines the control for the wireless systems based on the priority information attached to the data frame. Furthermore, at least any one of the transmission frequency, the route, the transmission timing, the transmission power, and the antenna directivity is subject to control by the wireless system control unit, and Consequently, if there is a sudden and significant change in ongoing communications, the status of the communications network and the surrounding environment can be detected quickly, and a more appropriate communications policy can be selected and determined. Consequently, the wireless systems can be controlled quickly, and flexible operation of the wireless systems can be supported. It is therefore possible to use frequency resources, effectively, not only in the corresponding wireless system, but also in the whole system formed with a plurality of wireless systems.

According to the fifth invention, the data frame included in the communications policies received from the controller is checked, the priority field attached to the data frame is rewritten, the change is delivered to the controller after the rewriting, and the rewritten communications policies are maintained until a communications policy is delivered again. As a result of this, when there is a sudden and significant change in ongoing communications, it is possible to rewrite the data field determined by the communications policies, and change and rewrite without inquiring the controller. Consequently, the wireless systems can be controlled quickly, and flexible operation of the wireless systems can be supported.

According to the sixth invention, the controller includes a first step of acquiring information about data that the application equipment communicates via the wireless systems, a second step of acquiring information about a wireless environment that has an impact on communications by the wireless systems, a third step of generating a plurality of communications policies that are delivered to the wireless systems, a fourth step of managing the communications policies that are executed on the wireless systems, and a fifth step of carrying out data communications with the wireless systems. The wireless systems at least include a sixth step of storing the plurality of communications policies delivered from the controller, detecting the status of communications by the wireless systems, and changing the communications policies, and a seventh step of controlling information about data that the application equipment communicates via the wireless systems based on the communications policies. By this means, even when there is a sudden and significant change in ongoing communications, it is still possible to initiatively select and determine an appropriate communications policy via each wireless system. Consequently, the wireless systems can be controlled quickly, requirements such as low latency can be satisfied, and flexible operation of the wireless systems can be supported. It is possible to use frequency resources effectively, not only in the corresponding wireless system, but also in the whole system formed with a plurality of wireless systems. Furthermore, since a plurality of wireless systems are controlled based on different communications policies, it is possible to keep overall balance, and optimize the communications systems.

DESCRIPTION OF EMBODIMENTS

Embodiments of the communications network system according to the present invention will be described in detail below with reference to block diagrams and flowcharts. Note that, regarding the reference numerals in the block diagrams, the same reference numerals will be used for blocks having the same functions, unless there are special circumstances.

The communications network system according to the present invention is intended especially for communications between application equipment via wireless systems, and is used in, for example, the sites of present or future development or manufacturing factories and the auxiliary facilities of manufacturing sites, the sites of processing factories and the auxiliary facilities of processing sites, and the sites of distribution warehouses and the auxiliary facilities of distribution warehouses. The controller and the wireless systems are all installed for individual purposes, and are configured so as to cooperate with other controllers via wireless systems.

Each wireless system is connected per group of higher controllers, or in a predetermined range (area, direction, etc.), and the controllers perform control via connecting wireless systems. In the communications network system according to the present invention, one controller, wireless systems, and application equipment are connected.

Figure 1:
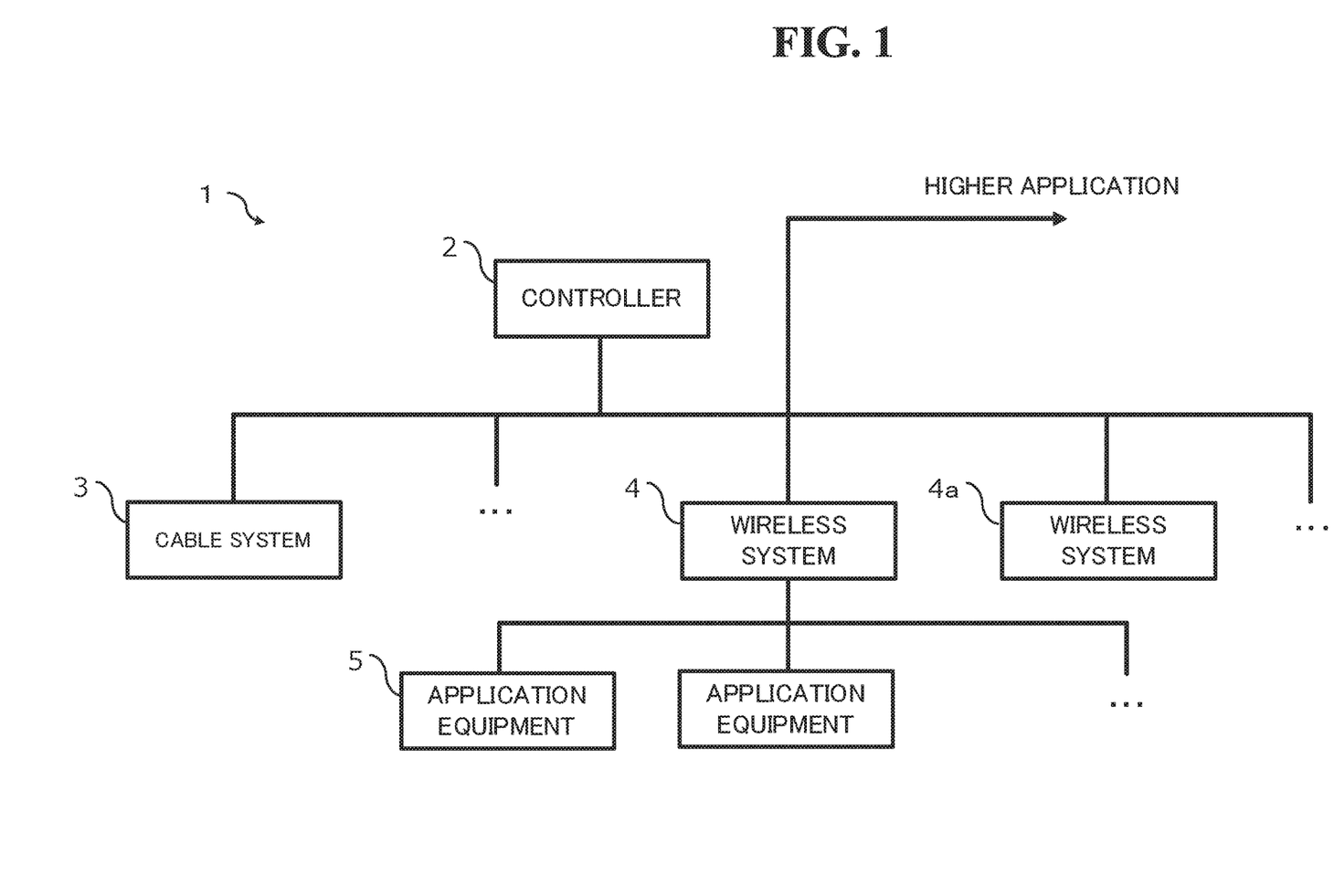
FIG. 1 is a block diagram to show a communications network system according to the present invention.

FIG. 1 shows a block diagram of a communications network system 1 according to the present invention. To be more specific, the communications network system 1 according to the present invention is, for example, a communications network system 1 for an individual factory or warehouse, and introduced for the purpose of "collecting management information" in each factory or warehouse. The communications network system 1 is configured so that each application equipment 5 (higher application, which is not shown), a controller 2, and devices (sensors, cameras, etc.) that serve as application equipment 5 for collecting various information are connected via cable systems 3 and wireless systems 4.

For example, if sensors or cameras of terminal devices are used, the application equipment acquires information of the data communicated via the wireless systems. On the other hand, when a higher application is deployed, this higher application functions as a server in the facilities of factories and warehouses and as software installed in the server, collects the data acquired by the sensors and cameras of the application equipment 5, and analyzes and visualizes the collected data.

A cable system 3 is a local area network constructed by cables for cable networks, and a wireless system 4 is a local area network constructed by using wireless communications. The wireless system 4 is appropriately constructed in accordance with, for example, the communications environment in each factory or warehouse, and the features of the wireless use case. Since the size of data, the frequency of data generation, the number of wireless terminals, and so forth vary from system to system, the radio frequency band and the wireless standard to use differ depending on what function is required.

For example, relatively high radio frequency bands such as the 60 GHz band are used in systems that handle a large amount of data (such as image inspection devices), and the 5 GHz band and the 2.4 GHz band are used in systems where the size of data and the frequency of data generation are moderate, as in control program broadcast, mobile equipment control, and so on. Furthermore, relatively low radio frequency bands such as the 920 MHz band are used in application equipment that requires power saving (as in environmental sensing).

Furthermore, regarding the latency allowed in the wireless systems 4, in robot control, emergency notification and/or others, there are cases where a latency of one millisecond or less is required, because the timing of arrival of such information needs to be high in accuracy and urgency. On the other hand, in the case of quality (such as infrastructure inspection) and management (such as preventive maintenance), there are cases where a latency of ten milliseconds or more is allowed.

Figure 2:
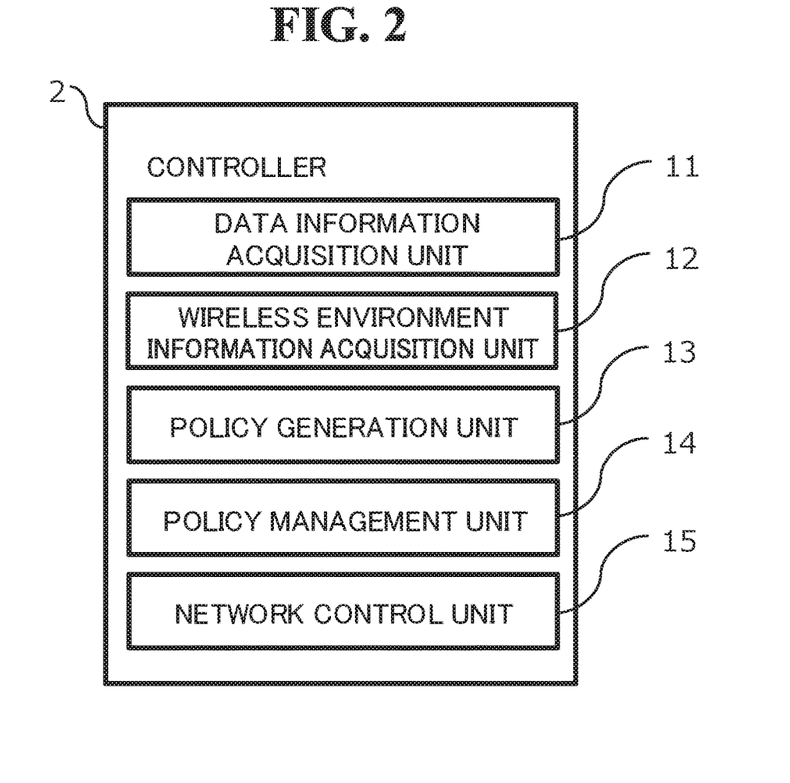
FIG. 2 is a block diagram to show a configuration of a controller according to the present invention.

FIG. 2 shows a block diagram of a controller 2 according to the present invention. The controller 2 is constructed by an individual communications network system 1, as has been described above, and a data information acquisition unit 11 acquires data information from the application equipment via the cable systems 3 and the wireless systems 4 connected to the controller 2. The wireless environment information acquisition unit 12 acquires information of at least any one of the status of the communications network of the wireless system 4, the communications parameters for wireless communications performed in the surrounding environment, the quality of communications in transmission and receipt, the status of use of frequencies, and so forth.

A policy generation unit 13, which generates a plurality of communications policies to deliver to the wireless systems 4, generates a plurality of patterns of communications policies to deliver to the wireless systems 4, per wireless system 4, based on the purpose of the communications network system 1, the data information that is accessed or exchanged, or information about the wireless environment in an individual factory or warehouse. The specific configurations of communications policies will be described later with reference to FIG. 4.

A policy management unit 14 manages the communications policies for each wireless system 4 generated by the policy generation unit 13. Each communications policy is managed by the policy management unit 14 so that a plurality of communications policies are grouped, or one communications policy is managed, per wireless system 4. To be more specific, each communications policy is delivered to a target wireless system 4, at an appropriate timing, based on the connecting wireless system 4, relationship with other wireless systems 4, and a variety of conditions.

Based on communication policies managed in the above-described policy management unit 14 and delivered to each wireless system 4, the network control unit 15 controls the intermediate network where communications are carried out via the wireless systems 4. To be more specific, the communications network system is appropriately controlled so that a plurality of wireless systems 4 managed by the policy management unit 14 of the controller 2 described above are controlled, and the wireless systems 4 in the communications network system 1 achieve overall optimization.

Figure 3:
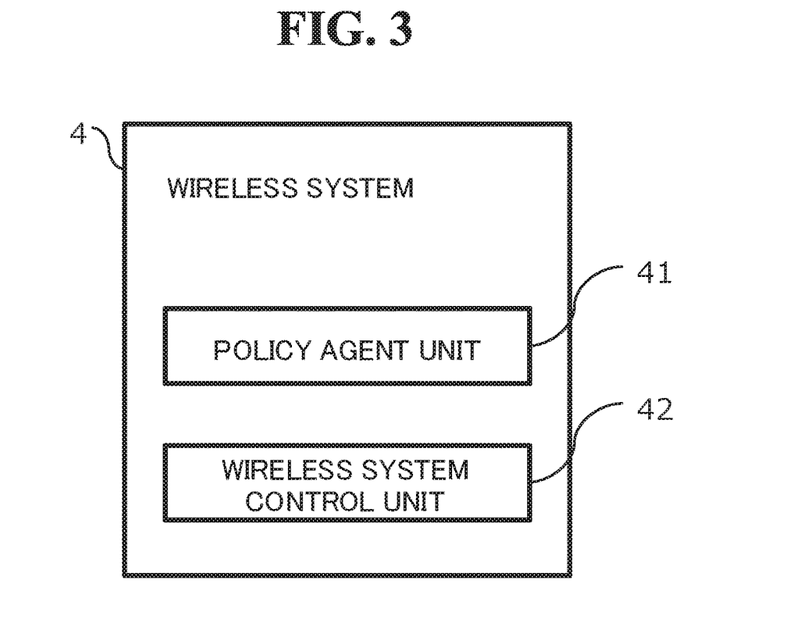
FIG. 3 is a block diagram to show a configuration of a wireless system according to the present invention.

FIG. 3 shows a block diagram of a wireless system 4 according to the present invention. The wireless system 4 is connected under the controller 2 described above, stores communications policies delivered from the controller 2, and, based on these communications policies, carries out data communications with the application equipment 5 connected under the wireless system 4. For example, the application equipment 5 is line sensors, environment sensors, surveillance cameras, and so forth, and installed on each manufacturing line, pillar, and elsewhere in an individual factory or warehouse.

A policy agent unit 41 stores a plurality of communications policies delivered from the policy management unit 14 of the controller 2 (not shown), determines an appropriate communications policy from the communications policies, and carries out data communications with line sensors, environmental sensors, surveillance cameras, and so forth that are connected at a certain time or during a certain period of time.

Assuming a plurality of communications policies delivered to the wireless system 4, the controller 2 is configured to permit data communications and changes within these patterns (only within the range of the corresponding wireless system 4: local changes). Consequently, based on the status of communications with subordinate application equipment 5 or each higher system via the wireless system 4, and based on the criteria configured in the communications policies, the wireless system 4 determines optimal communications policies.

After changing to an optimal communications policy, the optimal communications policy is changed to a local policy that applies only under communications via the wireless system 4. This change of communications policy is made quickly, without inquiring the controller 2 in advance. Then, after the communications policy is changed, to which communications policy the communications policy has been changed is delivered to the controller 2. Upon receiving the delivery of the change of communications policy from the wireless system 4, the controller 2 updates the wireless system 4 and the communications policies that are subject to management by the policy management unit 14.

Note that, when the policy management unit 14 of the controller 2 receives a notification of change of communications policy from a predetermined wireless system 4, the policy management unit 14 judges the overall optimization of the communications network system 1 from the status of communications, the count of receipt, the burden of channels, and so forth in the communications network system 1, applications, other wireless systems 4 and/or others, the type and significance of target data communications, and so forth. Then, if it is judged that the communications policy needs to be changed, the policy generation unit 13 generates a new communications policy or updates an existing communications policy, and redelivers it to the corresponding wireless system 4.

Figure 4:
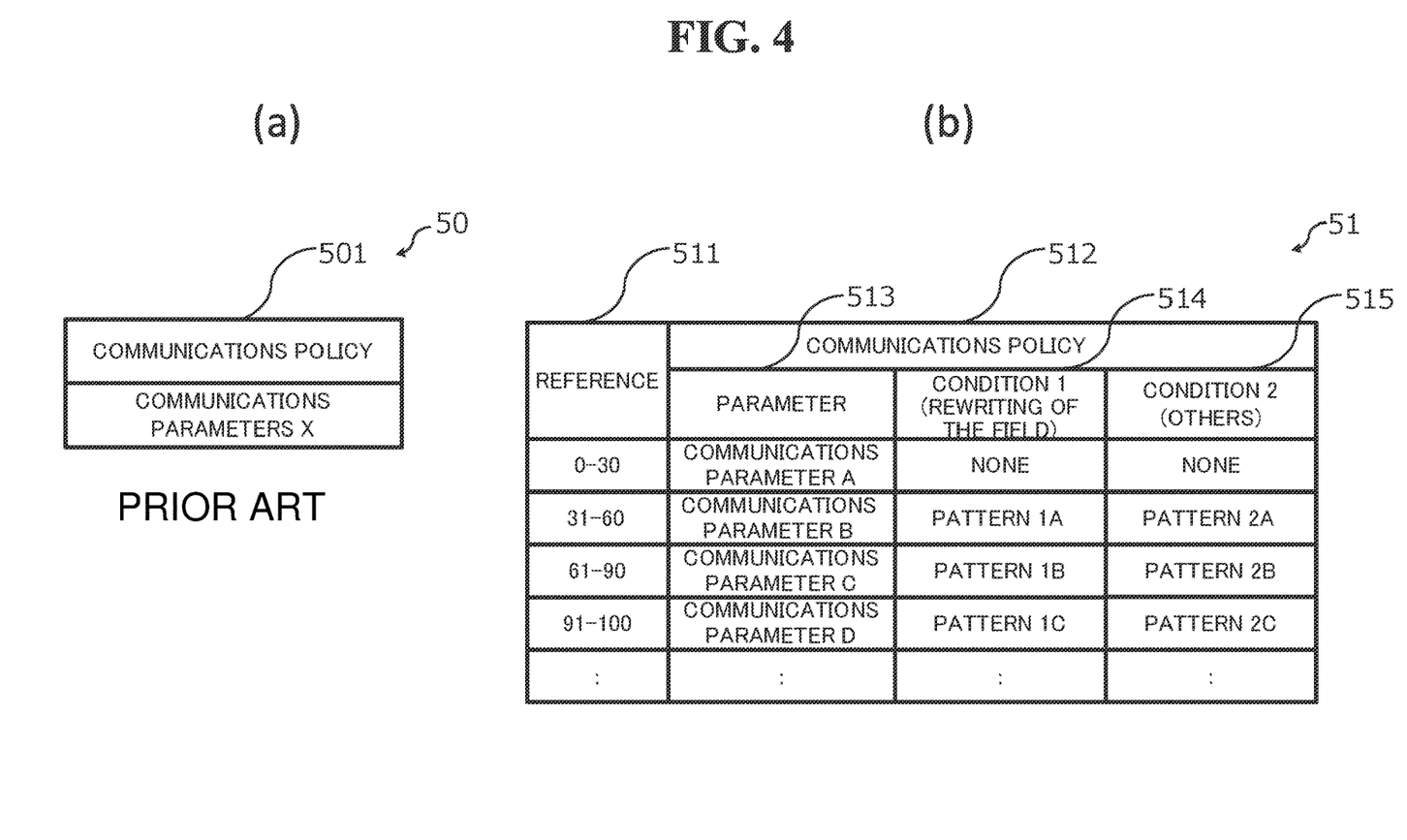
FIG. 4 provide diagrams to show data structures for (a) conventional policies and (b) policies according to the present invention.

FIG. 4 shows the respective data structures of conventional policies 50 (a) and policies 51 (b) according to the present invention. As for the conventional policies 50, predetermined communications parameters X are generated as communications policies 501 by the controller 2, and the communications policies 501 are delivered to the wireless system 4. The communications parameters X include, for example, the frequency used, the modulation scheme, the error correction code, and the number of retransmissions when data delivery fails, and include, in wireless LAN, the CW (Contention Window) for determining transmission timing, the frame transmission interval, the transmission-occupied time (TXOP (Transmission Opportunity)) of the frequency channel, and so on, and the communications policies 501 are generated and delivered to the wireless system 4 depending on what data communications and status of communications are assumed.

With such conventional policies 50, when data communications or the communications environment changes dynamically—for example, suddenly and significantly—the conventional policies 50, which are fixed, cannot cope with such sudden changes in the communications environment.

In particular, if a conventional fixed policy 50 is used in communications in which low latency is required, it may not be possible to provide an update in time when a sudden and significant change occurs, and, if the wireless quality deteriorates, the communications between the controller 2 and the wireless system 4 becomes unstable, which makes it not possible to update the policy 50 quickly.

On the other hand, policies 51 (*b*) according to the present invention are configured by providing predetermined references 511 and configuring different communications policies 512 based on each reference 511, so that the policies 51 (*b*) can be updated flexibly and quickly, on the wireless system 4 (local) side, even when there are sudden and significant changes. To be more specific, the communications policies 512 include a condition 1 (rewriting of the field, which is attached to the data and in which the priority is described) 514 and a condition 2 (others) 515, in addition to the conventional communications parameters X that match the reference 511.

The reference 511 is divided into a plurality of stages by varying numerical values that relate to the communications network system, and, for example, divided based on the state of data communications—that is, the timing and quality of data communications, the channel usage of the wireless system 4, the RTT (Round Trip Time), and so forth—and the reference 511 can be changed flexibly based on these stages, and communications policies 512 included in different communications policies 512 are configured.

For example, when the configuration of the reference 511 of the default policy 51 delivered from the controller 2 is "0 to 30", the wireless system 4 configures "Parameter 513: Communications parameter A", "Condition 1 (field rewriting) 514: None", and "Condition 2 (others) 515: None", for the configuration of the communications policies 512. After that, when a sudden and significant change is detected in the communications network system 1 and the reference changes to "65", the policy agent unit 41 changes the configuration of the reference 511 to "Reference 511: 61 to 90", "Parameter 513: Communications parameter C", "Condition 1 (field rewriting) 514: Pattern 1B", "Condition 2 (others) 515: Pattern 2B", locally, as policies 51 for the wireless system 4.

The change of communications policies 512 included in the policies 51 of the policy agent unit 41 of the wireless system 4 is determined based on the reference 511 of the policies 51 delivered from the controller 2, and the corresponding communications policy 512 is configured, and data communications is performed by a wireless system control unit 42. This updating of the policy 51 takes place in the policy generation unit 13 of the controller 2.

Figure 5:
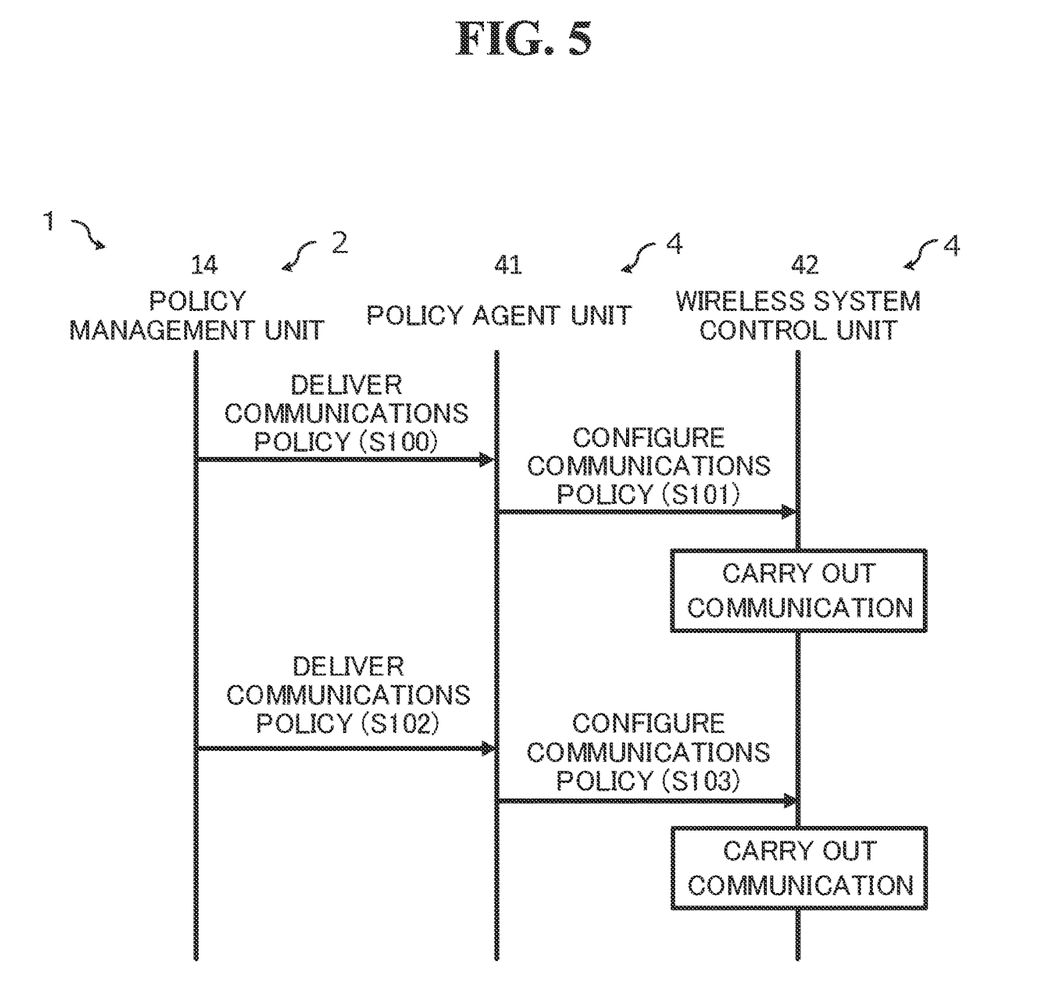
FIG. 5 is a processing flowchart in a conventional communications network system.

FIG. 5 is a processing flowchart for intermediate data communications, where communications takes place via the controller 2 and the wireless system 4 in the conventional communications network system 1. The controller 2 and the wireless system 4 are connected via the communications network. The policy management unit 14 of the controller 2 delivers a policy 50, generated by the policy generation unit 13 that generates a plurality of communications policies to deliver to the wireless system, to the policy agent unit 41 of the wireless system 4 (S100). In the wireless system 4, the policy 50 is received by the policy agent unit 41, the received policy 50 is stored in a storage unit (not shown), and a communications policy 501 is configured (S101).

The wireless system control unit 42 carries out data communications with the lower application equipment 5 (line sensors, environmental sensors, surveillance cameras, etc.) that is connected to the wireless system control unit 42, based on the communications policy 501 configured by the policy agent unit 41.

Although the wireless system 4 carries out data communications based on the communications policy 501 of the policy 50 configured by the policy agent unit 41, even if the policy agent unit 41 detects a change in the data communications environment, the wireless system 4 repeats carrying out data communications based on the communications policy 501 configured by the policy agent unit 41.

The controller 2 updates the communications policy 501 of the policy 50 managed in the policy management unit 14, and the updated policy 50 is delivered to the wireless system 4 by the policy management unit 14 (S102). The policy agent unit 41 of the wireless system 4 configures the policy 50 that is newly delivered from the controller 2 (S103).

The wireless system control unit 42 communicates with the application equipment 5 based on the communications policy 501 updated and configured by the policy agent unit 41.

Figure 6:
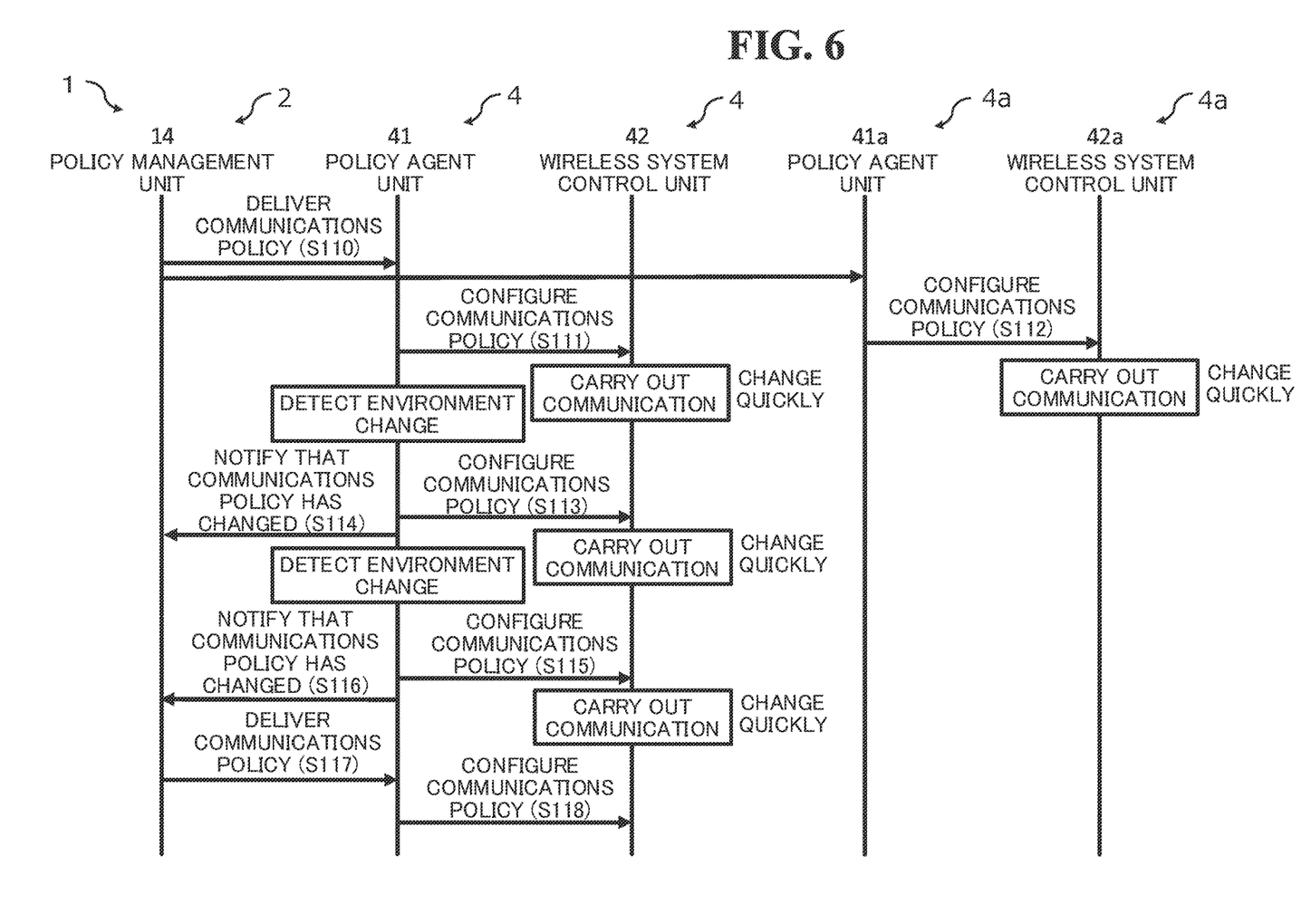
FIG. 6 is a processing flowchart in a communications network system according to the present invention.

FIG. 6 shows a processing flowchart in the communications network system according to the present invention. The controller 2 and the wireless system 4 and the wireless systems 4a are connected via the communications network. Note that, although two wireless systems will be described with this example, three or more wireless systems may be installed.

The policy management unit 14 of the controller 2 delivers a plurality of policies 51 that are generated by the policy generation unit 13 to deliver to the connecting wireless system 4 and the wireless system 4a, to the wireless system 4 and the policy agent unit 41 of the wireless system 4a (S110). Regarding the communications policies 512 generated here, the policy 51, in which the same communications policies 512 are defined, is delivered to the wireless system 4 and the wireless system 4a (or more), as described above. Alternatively, when the policy 51 to be delivered is a policy 51 to include communications policies 512, which are set forth in a plurality of patterns for a specific wireless system 4, the policy 51 is delivered to that one specific wireless system 4.

The policy agent unit 41 of the wireless system 4 receives the policy 51 delivered from the controller 2, and stores the received policy 51 in a storage unit (not shown). The policy 51 includes communications policies 512 to match a plurality of references 511. The policy agent unit 41 configures one communications policy 512, from among a plurality of communications policies 512, based on environmental circumstances, carries out communications in the wireless system control unit 42, and then, if an environmental change is detected in the policy agent unit 41, changes the communications policy 512 to an appropriate communications policy 512. The wireless system control unit 42 carries out communications based on the communications policy 512 changed in the policy agent unit 41.

First, the wireless system control unit 42 of the wireless system 4, carries out data communications, with the lower application equipment 5 connected via the wireless system 4, based on the reference 511 and the communications policy 512 configured by the policy agent unit 41 (S111).

The policy management unit 14 of the controller 2 also delivers the policy 51 to another wireless system 4a in (S110), and the policy agent unit 41a receives the policy 51 delivered from the controller 2, and stores the received policy 51 in a storage unit (not shown). Regarding the policy 51, when the configuration and role are the same as those of the wireless system 4, the same policy 51 is delivered, whereas, when the configuration and role are different, a communications policy 512 that matches another number of references 511 is generated, and that policy 51 is delivered.

The policy agent unit 41a, receiving a policy 51 corresponding to the wireless system 4a from the policy management unit 14 of the controller 2, sets the communications policy 512 included in the policy 51, and, furthermore, configures one of them as the pattern of data communications with the wireless system 4a (S112).

The wireless system control unit 42a of the wireless system 4a, carries out data communications, with the lower application equipment 5 connected via the wireless system 4a, based on the reference 511 and the communications policy 512 configured by the policy agent unit 41a. By this means, a plurality of wireless systems are controlled based on different communications policies, so that it is possible to keep overall balance, and optimize the communications systems.

Next, regarding the patterns of data communications in the policy agent unit 41, the process of data communications in a normal state and the process of data communications when an environmental change is detected will be shown below.

(Pattern 1: Normal State)

The policy agent unit 41 of the wireless system 4 checks the current state of the communications environment, and, if there is no particular problem as a result, configures a policy 51 as a default configuration pattern, for example. In this case, "Reference 511: 0-30", "Parameter 513: Communications parameter A", "Condition 1 (field rewriting) 514: None", and "Condition 2 (others) 515: None" are applied, and the wireless system control unit 42 carries out data communications with the application equipment 5 based on this configuration.

(Pattern 2: Changed State 1)

Next, an example in which the communications environment changes from above "Pattern 1: Normal state" will be shown. In this case, the policy agent unit 41 of the wireless system 4 checks the current state of the communications environment. As a result of this, the policy agent unit 41 detects that the communications environment in the corresponding wireless system 4 has changed, based on information, such as communications history of the wireless environment information acquisition unit 12 or the wireless system control unit 42. Then, when the policy agent unit 41 judges that the data communications environment has changed, the policy agent unit 41 changes the communications policy 512 based on, for example, the reference 511 of the policy 51 configured as a default configuration pattern.

In this case, as described above, the change of the reference is judged based on the state of data communications—that is, the timing and quality of data communications, the rate of use of channels in the wireless system 4, conditions such as RTT, or changes in the environment. Based on the result of this judgement, for example, "Reference 511: 31-60", "Parameter 513: Communications parameter B", "Condition 1 (field rewriting) 514: Pattern 1A", and "Condition 2 (others) 515: Pattern 2A" are selected. Then, the policy agent unit 41 changes the configuration of the policy 51 (S113).

The wireless system control unit 42 quickly carries out data communications with the application equipment 5, based on the configuration changed from the policy configuration used up till then ("Reference 511: 0-30", "Parameter 513: Communications parameter A", "Condition 1 (field rewrite) 514: None", and "Condition 2 (others) 515: None") to ("Reference 511: 31-60", "Parameter 513: Communications parameter B", "Condition 1 (field rewriting) 514: Pattern 1A", and "Condition 2 (others) 515: Pattern 2A").

This change of the communications policy 512 takes place in the policy agent unit 41 and the wireless system control unit 42 of the wireless system 4, and so no grant is given in advance to the controller 2. Consequently, it is not necessary to retransmit the communications policy from the controller 2, and the wireless system 4 can take the initiative in selecting and determining an appropriate communications policy 512.

The policy agent unit 41 gives notice that the above-described communications policy 512 has changed, to the policy management unit 14 of the controller 2 (S114).

The policy agent unit 41 later keeps checking the state of each communications environment, and, as a result of this, the policy agent unit 41 acquires indices for judging that the communications environment has changed in the corresponding wireless system 4, that the wireless environment of the wireless environment information acquisition unit 12 or the wireless system control unit 42 has deteriorated, or that the communications quality therefore cannot be achieved. As a result of this, if it is judged again that there has been a change in the data communications environment, as described above, the policy agent unit 41 determines an appropriate communications policy 512 from among a plurality of communications policy patterns, and changes to this communications policy 512 (S115). Following this change, the wireless system control unit 42 carries out data communications with the application equipment 5 using the communications policy 512 after the change.

The policy agent unit 41 again gives notice that the above-described communications policy 512 has changed, to the policy management unit 14 of the controller 2 (S116).

The policy management unit 14 of the controller 2 receives the notification of change of the communications policy from the wireless system 4. At that time, if there are a plurality of wireless systems 4 connected to the controller 2, the controller 2 judges from which wireless system 4 the change notification has arrived, how often that notification is delivered, whether other wireless systems 4 are in the same state, the priority of the data communications of each wireless system 4, whether there are alternative methods or times for delivery, and so forth. Then, a policy 51 is updated in the policy generation unit 13, and managed in the policy management unit 14.

If the policy management unit 14 judges that a policy 51 to deliver to the connecting wireless system 4 has been updated, the updated policy 51 is delivered to the corresponding wireless system 4 (S117).

The policy agent unit 41 of the wireless system 4, to which the updated policy 51 is delivered from the policy management unit 14, stores the updated policy 51. Then, as described above, the policy agent unit 41 detects the state of each communications environment with the application equipment 5 (for example, line sensors, environmental sensors, surveillance cameras, etc.) that is connected via the wireless system 4, and the conditions of change in other environments, selects an appropriate reference 511, and configures the communications policy 512 defined in the reference 511, and the wireless system control unit 42 carries out data communications (S118).

Figure 7:
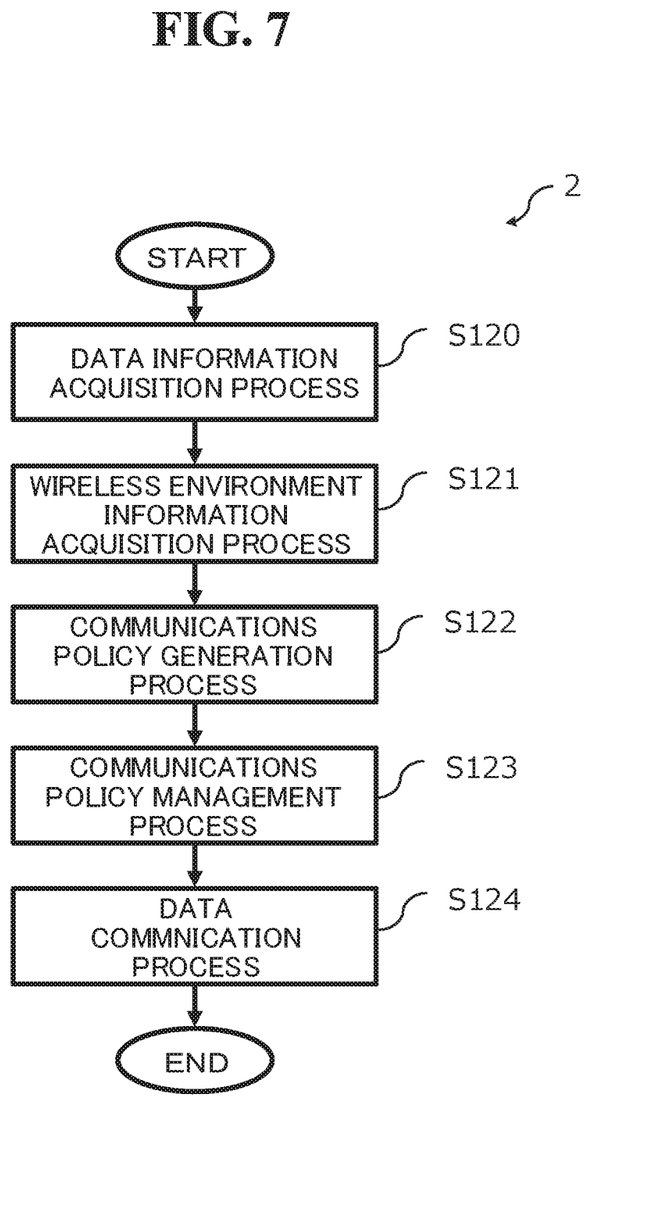
FIG. 7 is a processing flowchart in a controller according to the present invention.

FIG. 7 shows a processing flowchart in the controller 2 according to the present invention. The controller 2 is connected to the communications network system 1 described above, and controls one or more additional wireless systems 4 that are connected. The controller 2 performs the process of acquiring data information related to the status of communications and the communications environment of the communications network system 1 and the wireless system 4 in the data information acquisition unit 11, generating communications policies based on the acquired information, managing the generated communications policies, and carrying out data communications with the connecting wireless system 4 and the wireless system 4a, in following step 120 (S120) to step 124 (S124).

(Step 120)

When acquiring the information related to data, the data information acquisition unit 11 acquires information about equipment information related to a higher communications network system 1 connected to the controller 2, a subordinate wireless system 4 and a wireless system 4a, and, furthermore, each application equipment 5 (for example, the properties of data, the configuration values, the parameters/types of the data to be acquired, the data size, the frequency of acquisition, the rules for rewriting of data agreed between devices, the priorities of rewriting priorities, alternative values, etc.).

The information of the data to be acquired includes the default configuration values in the equipment of each communications network system 1, the application equipment and/or the like described above, or the data information for generating each reference 511 and communications policy 512 of the policy 51, and is stored in a storage unit inside the controller 2.

(Step 121)

The wireless environment information acquisition unit 12 acquires information about the operation and management of the higher communications network system 1 and the subordinate wireless system 4, and, furthermore, each application equipment 5 (for example, communications parameters in wireless communications), and, information about the wireless communications environment (for example, communications quality in transmission and receipt, such as received power, RTT and the count of retries, the status of use of frequencies such as the rate of use of communications channels).

Note that the information acquiring process in step 120 (S120) and step 121 (S121) can be updated appropriately in the controller 2 or in higher application equipment (not shown) that controls the controller 2, and updated at predetermined timings.

(Step 122)

To generate policies related to the wireless system 4 and the wireless system 4a, in the policy generation unit 13, where a plurality of communications policies to deliver to the wireless system are generated, a policy 51 formed with a plurality of references 511 and communications policies 512 to be delivered to the connecting wireless system 4 and the wireless system 4a, and to be controlled and executed by the wireless system 4 and wireless system 4a is generated based on each information acquired in the data information acquisition unit 11 and the wireless environment information acquisition unit 12 described above. The communications policies 512 generated here further configure the parameters 513, condition 1 (field rewriting) 514, and condition 2 (others) 515.

Note that the policy 51 generated in the policy generation unit 13 may be a policy 51 that is in common to the wireless system 4, the wireless system 4a, and other wireless systems (not shown), and, in this case, may be configured to be delivered at once. As for what policy 51 is generated, when different policies 51 are generated for the wireless system 4, the wireless system 4a, and other wireless systems (not shown), each generated policy 51 is delivered.

(Step 123)

Regarding the management of the generated policies 51, the policy management unit 14 manages the updating of the policies 51, formed with a plurality of references 511 and communications policies 512, generated in step 122 and delivered to each wireless system 4 and wireless system 4a, and the management of history, and so on. Each communications policy 512 for a plurality of wireless systems 4 connected to the controller 2 is associated with each wireless system 4 and managed. The policy management unit 14 stores policies 51 that have been generated, policies 51 that are delivered, and policies 51 that are newly generated (including those not delivered yet).

Note that, in the management of policies 51 in the policy management unit 14, the policy 51 related to a plurality of target wireless systems 4 and wireless system 4a that are currently connected is managed. Furthermore, the history as to which reference 511 and communications policy 512 have been applied to which wireless system 4 and wireless system 4a is also managed together. The status of their management is checked and updated, and may be configured to be managed all together in a configuration (not shown) provided in the controller 2 or in higher application equipment.

(Step 124)

The process related to the delivery of policies 51 managed in the policy management unit 14 is finished when, in the network control unit 15, a policy 51, among the policies 51 generated in step 122 and managed in step 123, is delivered to a predetermined wireless system 4 and a wireless system 4a.

Figure 8:
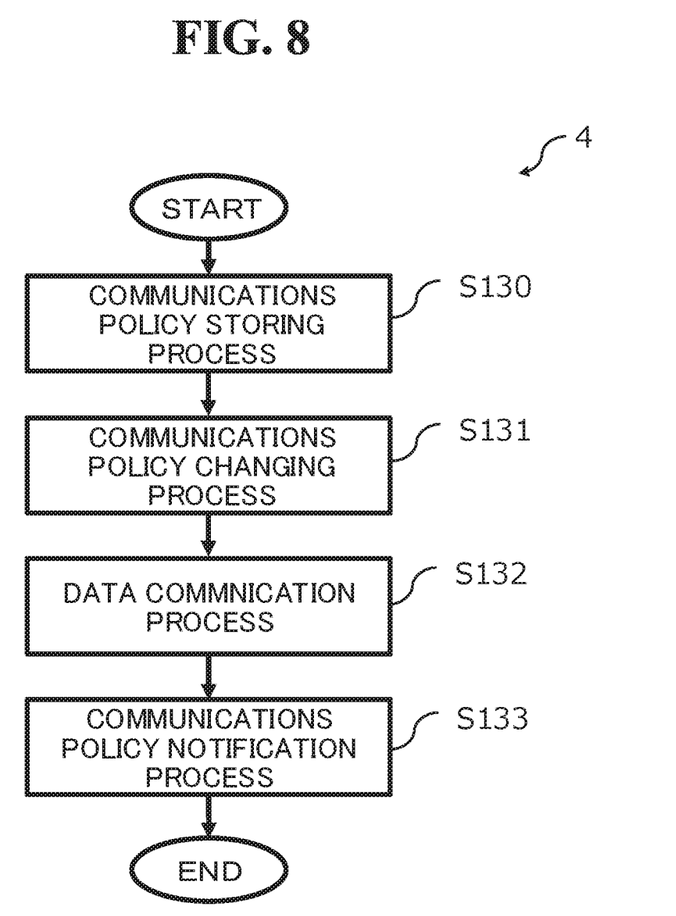
FIG. 8 is a processing flowchart in a wireless system according to the present invention.

FIG. 8 shows a processing flowchart in the wireless system 4 of the present invention. The wireless system 4 is connected to the controller 2 and receives the policies 51, generated in the policy generation unit 13 that generates a plurality of communications policies that are delivered to the wireless systems of the controller 2, from the network control unit 15. The policies 51, after receipt, are stored, the policy agent unit 41 determines an appropriate reference 511 and communications policy 512 based on the status of communications and so forth, and the wireless system control unit 42 carries out data communications with the application equipment 5 based on the determined reference 511 and communications policy 512.

(Step 130)

The policy agent unit 41 of the wireless system 4 receives the policy 51 delivered in step 125 above, and stores it in the storage unit of the wireless system 4 (not shown). The memory is sequentially stored based on the date and time of delivery from the controller 2, or based on the identification numbers assigned to the policies 51. The policies 51 may be stored as one block of data, or the policies 51 may be configured so that only updated information such as specific items or numerical values included in the policies 51 is received. In this case, only the updated information of the items or numerical values corresponding to the reference 511, the parameter 513, the condition 1 (field rewriting) 514, or the condition 2 (others) 515, and/or others included in the policies 51 is overwritten, and the communications policies 512 are updated.

(Step 131)

When the policy agent unit 41 detects a sudden and significant change during communications with subordinate application equipment 5 via the wireless system 4, as a change in the communications environment, the policy agent unit 41 switches to another suitable communications policy 512, based on the reference 511 of the policy 51 that is then configured. In addition, regarding this change of the communication policy 512, even if no sudden and significant change is detected during communications with subordinate application equipment 5 via the corresponding wireless system 4, if the policy management unit 14 of the controller 2 or the policy agent unit 41 judges necessary for the operation of overall-optimal data communications, a pattern that is suitable for the operation of overall-optimal data communications is selected from among a plurality of communications policies 512.

(Step 132)

In the wireless system control unit 42, data communications is performed with subordinate connecting wireless terminals, based on the communications policy 512 configured in the above-described policy agent unit 41. When the environment change is detected in the policy agent unit 41 of the wireless system 4 and the communications policy 512 is changed, this change is immediately applied, and data communications (local communications of the wireless system 4) is restarted based on the communications policy 512 after the change.

In this way, policies 51 to include communications policies 512 that correspond to a plurality of references 511 are provided, so that it is possible to change the communications policies 512 without waiting for an inquiry to the controller 2 and a reply, and to carry out data communications.

(Step 133)

After the communications policy 512 is changed in step 131, the policy agent unit 41 notifies the controller 2 to which communications policy 512 is switched to carry out data communications, and finishes the process. Although this process has been described in relationship to the wireless system 4, the same applies to the wireless system 4a and other connecting wireless systems.

By this means, it is possible to provide a communications network system that is formed with a controller, one or more wireless systems, and application equipment, and that, even when there is a sudden and significant change in ongoing communications, can control a plurality of wireless systems 4 quickly, meet the requirements such as low latency, and use frequency resources effectively in the whole system formed with a plurality of wireless systems.

With the communications network method according to this embodiment, the controller 2 described above includes a first step of acquiring information about the data which the application equipment communicates via wireless systems 4, a second step of acquiring information about the wireless environment that has an impact on the communications performed by the wireless systems 4, a third step of generating a plurality of communications policies that are delivered to the wireless systems 4, a fourth step of managing the communications policies executed on the wireless systems 4, and a fifth step of carrying out data communications with the wireless systems. The wireless systems 4 at least include a sixth step of storing a plurality of communications policies delivered from the controller 2, detecting the status of communications performed by the wireless systems 4, and changing the communications policies 512 based on the detection result, and a seventh step of controlling information about the data which the application equipment communicates via the wireless systems based on the communications policies 512.

As set forth in the contents described above, this allows a plurality of wireless systems 4 to select and determine an appropriate communications policy 512 based on the reference 511, even when there is a sudden and significant change in ongoing communications. Consequently, it is possible to quickly control each application equipment 5 that is connected to the wireless system 4 and the wireless system 4a (or more) without inquiring the controller 2, and support the operation between each wireless system and the application equipment 5 in a flexible manner. It is therefore possible to use frequency resources, effectively, not only in the corresponding wireless system 4, but also in the whole system formed with a plurality of wireless systems.

Furthermore, in the sixth step described above, depending on the conditions of environmental changes, each information such as the items and numerical values of the parameter 513, the condition 1 (field rewriting) 514, or the condition 2 (others) 515 included in the communications policy 512 are appropriately overwritten and reflected on updated communications policies 512, so that it is possible to perform fast data communications that can cope with changes.

In this way, it is possible to provide a communications network system that can control a plurality of wireless systems 4, meet requirements such as low latency, and use frequency resources effectively in the whole system formed with a plurality of wireless systems 4. Furthermore, since a plurality of wireless systems are controlled based on different communications policies, it is possible to keep overall balance, and optimize the communications systems.

REFERENCE SIGNS LIST

1: communications network system
2: controller
3: cable system
4, 4a: wireless system
5: application equipment (terminal device)
11: data information acquisition unit
12: wireless environment information acquisition unit
13: policy generation unit
14: policy management unit
15: network control unit
41, 41a: policy agent unit
42, 42a: wireless system control unit
50: policy (conventional)
51: policy (present invention)
501: communications policy (conventional)
511: reference
512: communications policy (present invention)
513: parameter
514: condition 1 (field rewriting)
515: condition 2 (others)
X: communications parameter

The invention claimed is:

1. A communications network system comprising:
a controller;
at least one wireless system; and
application equipment,
wherein the controller is configured to execute processes comprising:
a data information acquisition process to acquire information about data that the application equipment communicates via the at least one wireless system;
a wireless environment information acquisition process to acquire information about a wireless environment that has an impact on communications by the at least one wireless system;
a policy generation process to generate a plurality of communications policies that are delivered to the at least one wireless system;

a policy management process to manage the communications policies that are executed on the at least one wireless system; and
a network control process to carry out data communications with the at least one wireless system,
wherein the at least one wireless system is configured to execute processes comprising:
a policy agent control process to store the plurality of communications policies delivered by the controller, detect a status of communications by the at least one wireless system, and change to one of the plurality of stored communications policies based on a result of detecting the status of communications; and
a wireless system control process to control the information about data that the application equipment communicates via the at least one wireless system based on the communications policies, and
wherein the policy agent control process changes to the one of the plurality of stored communications policies, without inquiring the controller in advance, delivers the plurality of stored communications policies to the controller after the change to the one of the plurality of stored communications policies, and maintains the communications policies until a communications policy is delivered again.

2. The communications network system according to claim 1, wherein at least one of a transmission frequency, a route, a transmission timing, transmission power, and antenna directivity is subject to control in the wireless system control process.

3. The communications network system according to claim 2, wherein the control in the wireless system control process is determined based on at least the communications policies and priority information that is attached to a data frame of a packet communicated via the at least one wireless system.

4. The communications network system according to claim 3, wherein the policy agent control process checks on a stored data frame, and rewrites the priority information attached to the data frame.

5. The communications network system according to claim 1, wherein the control in the wireless system control process is determined based on at least the communications policies and priority information that is attached to a data frame of a packet communicated via the at least one wireless system.

6. The communications network system according to claim 5, wherein the policy agent control process checks on a stored data frame, and rewrites the priority information attached to the data frame.

7. A communications network system comprising:
a controller;
at least one wireless system; and
application equipment,
wherein the controller is configured to execute processes comprising:
a data information acquisition process to acquire information about data that the application equipment communicates via the at least one wireless system;
a wireless environment information acquisition process to acquire information about a wireless environment that has an impact on communications by the at least one wireless system;
a policy generation process to generate a plurality of communications policies that are delivered to the at least one wireless system;
a policy management process to manage the communications policies that are executed on the at least one wireless system; and
a network control process to carry out data communications with the at least one wireless system,
wherein the at least one wireless system is configured to execute processes comprising:
a policy agent control process to store the plurality of communications policies delivered by the controller, detect a status of communications by the at least one wireless system, and change to one of the plurality of stored communications policies based on a result of detecting the status of communications; and
a wireless system control process to control the information about data that the application equipment communicates via the at least one wireless system based on the communications policies, and
wherein the control in the wireless system control process is determined based on at least the communications policies and priority information that is attached to a data frame of a packet communicated via the at least one wireless system.

8. The communications network system according to claim 7, wherein the policy agent control process checks on a stored data frame, and rewrites the priority information attached to the data frame.

9. A communications network method in a communications network system comprising a controller, at least one wireless system, and application equipment, the method comprising:
by the controller:
acquiring information about data that the application equipment communicates via the at least one wireless system;
acquiring information about a wireless environment that has an impact on communications by the at least one wireless system;
generating a plurality of communications policies that are delivered to the at least one wireless system;
managing the communications policies that are executed on the at least one wireless system; and
carrying out data communications with the at least one wireless system, and
by the at least one wireless system:
storing the plurality of communications policies delivered by the controller, detecting a status of communications by the at least one wireless system, and changing to one of the plurality of stored communications policies based on a result of detecting the status of communications; and
controlling the information about data that the application equipment communicates via the at least one wireless system based on the communications policies,
wherein the changing comprises changing to the one of the plurality of stored communications policies, without inquiring the controller in advance, delivering the plurality of stored communications policies to the controller after the change to the one of the plurality of stored communications policies, and maintaining the communications policies until a communications policy is delivered again.

* * * * *